(12) United States Patent
Filer et al.

(10) Patent No.: US 8,230,121 B2
(45) Date of Patent: Jul. 24, 2012

(54) METHOD AND APPARATUS FOR IDENTIFYING A DEVICE HANDLE IN A COMPUTER SYSTEM

(75) Inventors: Roderick David Earle Filer, Vancouver (CA); Glenn Fawcett, Vancouver (CA)

(73) Assignee: Sierra Wireless, Inc., Richmond (CA)

( * ) Notice: Subject to any disclaimer, the term of this patent is extended or adjusted under 35 U.S.C. 154(b) by 74 days.

(21) Appl. No.: 12/650,887

(22) Filed: Dec. 31, 2009

(65) Prior Publication Data

US 2010/0174833 A1 Jul. 8, 2010

Related U.S. Application Data

(60) Provisional application No. 61/142,577, filed on Jan. 5, 2009.

(51) Int. Cl.
*G06F 3/00* (2006.01)
*G06F 13/00* (2006.01)

(52) U.S. Cl. .............. 710/8; 710/2; 710/5; 710/36

(58) Field of Classification Search .............. None
See application file for complete search history.

(56) References Cited

U.S. PATENT DOCUMENTS

| 5,787,246 | A | 7/1998 | Lichtman et al. | |
|---|---|---|---|---|
| 7,071,972 | B2 | 7/2006 | Koyama | |
| 2004/0064460 | A1* | 4/2004 | Pooni et al. | 707/100 |
| 2004/0244013 | A1* | 12/2004 | Yumoto | 719/321 |
| 2007/0162627 | A1 | 7/2007 | Kim et al. | |

OTHER PUBLICATIONS

Gooch, Richard, The Linux Device File System, 2001, EMC Corporation, [online, accessed on Jun. 20, 2011], URL: http://lwn.net/2001/features/OLS/pdf/pdf/devfs.pdf.*

Bothwick, N., "Connect your devices with udev," *Linux Format Magazine*, May 2005, pp. 90-93, Issue 66.
"Device file system," *Wikipedia Article*, Nov. 5, 2008, http://en.wikipedia.org/wiki/Character_device.
"Directory Definition," *The Linux Information Project*, Nov. 4, 2006, http://www.bellevuelinux.org/directory.html.
"File descriptor," *Wikipedia Article*, Nov. 13, 2008, http://en.wikipedia.org/wiki/Filehandle.
"File system," *Wikipedia Article*, Nov. 13, 2008, http://en.wikipedia.org/wiki/File_system.
Kroah-Hartman, G., "A Userspace Implementation of devfs," *Proceedings of the Linus Symposium*, Jul. 23-26, 2003, pp. 263-272.
Kroah-Hartman, G., "udev and devfs—The final word," *the Linux Kernel Archives*, Dec. 30, 2003, http://kernel.org/pub/linux/utils/kernel/hotplug/udev_vs_devfs.
Kroah-Hartman, G., "Persistent Device Naming in User Space," *Linux Journal*, Jun. 1, 2004, http://www.linuxjournal.com/article/7316, Issue 122.

(Continued)

*Primary Examiner* — Scott Sun (74) *Attorney, Agent, or Firm* — Saliwanchik Lloyd & Eisenschenk (57) ABSTRACT

The present invention provides a method and apparatus for identifying a desired device handle in a computer system such as a personal computer running Linux™. The desired device handle is capable of facilitating or providing for interaction with a desired peripheral device, such as a USB™ device. The invention comprises providing a database containing information associating device handles with peripheral devices. A first portion of the database is scanned for information associated with the desired peripheral device. This information is used in determining a second portion of the database, which is scanned for information indicative of the desired device handle. The desired device handle is then identified.

30 Claims, 5 Drawing Sheets

OTHER PUBLICATIONS

Mochel, P., "The sysfs Filesystem," *Proceedings of the 2005 Linux Symposium*, Jul. 2005, pp. 1-14, Ottawa, Canada.

"udev," *Wikipedia Article*, Nov. 20, 2008, http://en.wikipedia.org/wiki/Udev.

* cited by examiner

| Endpoint | USB Modem Type 1 | USB Modem Type 2 |
|---|---|---|
| 0 | USB Control endpoint | USB Control endpoint |
| 1 | Packet Data Protocol (PDP) endpoint. | Protocol # 1 endpoint |
| 2 | AT Command/Data endpoint | Protocol # 2 endpoint |
| 3 | Not available | GPS serial protocol endpoint |
| 4 | Not available | AT Command/Data endpoint |
| 5 | Not available | Packet Data Protocol (PDP) endpoint interface 1 |
| 6 | Not available | Packet Data Protocol (PDP) endpoint interface 2 |
| 7 | Not available | Packet Data Protocol (PDP) endpoint interface 3 |

METHOD AND APPARATUS FOR IDENTIFYING A DEVICE HANDLE IN A COMPUTER SYSTEM

CROSS-REFERENCE TO A RELATED APPLICATION

This application claims the benefit of U.S. provisional application Ser. No. 61/142,577, filed Jan. 5, 2009, which is incorporated herein by reference in its entirety.

FIELD OF THE INVENTION

The present invention pertains in general to configuration of computer systems and in particular to a method and apparatus for identifying means for communication between elements in a computing system, such as a device handle.

BACKGROUND

Many computer systems can be described as a modular collection of interacting hardware and software component devices. Proper operation relies on the ability of such devices to recognize each others' presence and appropriately address communications to an intended target. For example, when a peripheral device is connected to a computer system, it is desirable that the peripheral device and computer system should register each others' presence and take steps to enable communicative coupling between peripheral and computer. Manual, automatic and semi-automatic functions supporting such features have long been known in general, including hot plugging and plug-and-play architectures.

For example, when a USB™ device is connected to a computer, the computer system may automatically detect the device and proceed to enumerate it. USB™ enumeration typically refers to the process by which a host computer extracts a description of the number and types of communication channels, pipes or endpoints that are associated with a USB™ device, and configures means for communication with the USB™ device. The computer system may also determine the type of USB™ device, for example by retrieving one or more descriptors. Subsequently, the computer system may load and configure a device driver for facilitating interaction with the USB™ device. There may be several USB™ devices connected to the computer system.

Once devices are registered and communication means and/or parameters established, information relevant to inter-device communication is typically stored in a predetermined portion of the computer system's memory. For example, addresses and descriptors identified during USB™ enumeration are typically stored on a computer system's hard drive, RAM, or other rewritable memory. For example, computer systems having operating systems such as Windows™, Linux™, Unix™, Unix-like systems, or POSIX-compliant systems may store this information in a format particular to the operating system being used. The manner of retrieving the information, for example when selecting or configuring a device driver, therefore depends on the particular operating system in use.

As a particular example, currently available distributions of Linux™ support interaction with USB™ devices using commands such as "read( )" and "write( )" To interact with a USB™ device, such commands are addressed to a device handle associated with the USB™ device. In Linux™, device handles typically exist as file handles in the "/dev" directory off the root directory. For each endpoint of a USB™ device, there is a file handle of the form "/dev/ttyUSBn," where "n" represents a number assigned by Linux™ during enumeration. Communication with an endpoint can be performed by reading from or writing to the appropriate file handle. The assigned numbers "n" are typically assigned in ascending order, starting from zero, such that each endpoint (or possibly group of endpoints) receives a unique number. However there may be no predictable or consistent correspondence between USB™ endpoints and the file handle name. For example, "n" need not increase incrementally. Rather, numbers may be assigned to new endpoints in an ad-hoc manner, based on what numbers are already assigned. Therefore, software or device drivers cannot tell which file handle to use for communication with a particular endpoint by inspecting the contents of the "/dev" directory.

One potential solution to the problem of determining which device handle is associated with a particular USB™ device or endpoint is to use trial and error methods. For example, a list of all entries of the form "/dev/ttyUSBn" could be collected, and a trial communication could be performed using each device handle until the appropriate handle for communicating with the desired USB™ device or endpoint is found. However, this approach is cumbersome and can undesirably affect operation of the USB™ devices. For example, if the USB™ devices or endpoints are not compatible with the trial communication, their operation may be interrupted and have to be restarted, critical memory may be overwritten or destroyed, or other undesirable effects may occur. Moreover, device restarts may compound the problem as they may affect the device handle associations partway through such a trial and error approach. In addition, on a given computer system, there is no guarantee that the desired device handle, once discovered, will not change for example due to a re-enumeration event. This compounds the problem of using a cumbersome method such as a trial and error method for determining which device handle is associated with a particular USB™ device, since such methods must be repeated periodically.

Linux™ version 2.6 includes a feature called the sysfs file system. Sysfs includes a file system directory which provides an organized representation of devices and drivers recognized by the Linux™ system. For each device or driver added to the computer system, a directory in sysfs is created. The parent/child structuring of subdirectories within the /sys/devices/ directory reflects the physical layout of devices. Other subdirectories, such as /sys/bus, /sys/class and /sys/block contain other structural information regarding devices. However, while sysfs organizes device information, it remains an essentially passive data repository, which can change over time and may be difficult to interpret.

A Linux™-based module called "udev" was introduced in 2003 and described in "udev—A Userspace Implementation of devfs," by Greg Kroah-Hartmann, in Proceedings of the Linux™ Symposium, Jul. 23-26, 2003. Udev interacts with the hierarchical representation of all physical and virtual devices available through the sysfs file system, and with notifications of device addition and removal events provided through /sbin/hotplug. The udev module allows for several features including persistent naming of devices, notification of device changes, flexible device naming schemes, and dynamic resource assignment. However, while the udev module operates to dynamically create device files and simultaneously associate them with persistent device names, it does not provide for identifying already created device files. In addition, udev cannot identify a device unless the user has previously set up identification parameters, which can be time-consuming.

More generally, when two or more computer component devices are connected together, at least one of the devices may store two separate sets of information: a set of descriptors identifying the other devices, and a set of communication handles for communicating with them. However, these two sets of information may not be closely associated with each other. Furthermore, each device may have multiple communication handles associated therewith. Therefore, it is often difficult to determine which communication handle is associated with a particular component device, and which one is to be appropriate for a particular type of communication when the need arises.

An additional problem in the prior art is that, even after device handles are identified, they may subsequently change due to restarting or reconnection of a device.

Therefore there is a need for an improved method and apparatus for identifying a desired device handle in a host computer system that is not subject to one or more of the above limitations.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for identifying a device handle in a computer system. In accordance with an aspect of the present invention, there is provided a method for identifying a desired device handle in a host computer system, the desired device handle facilitating interaction with a desired peripheral device, the method comprising the steps of: providing a database containing encoded therein information associating one or more device handles with one or more peripheral devices; scanning, using a computer, a first portion of the database for one or more descriptor data entries associated with the desired peripheral device; determining, using a computer, one or more associated data entries of the database related to the one or more descriptor data entries; determining, using a computer, a second portion of the database based on the one or more associated data entries; scanning, using a computer, the second portion of the database for information indicative of the desired device handle; and identifying, using a computer, the desired device handle based on the information indicative thereof.

In accordance with another aspect of the present invention, there is provided an apparatus for identifying a desired device handle in a host computer system, the desired device handle facilitating interaction with a desired peripheral device, the apparatus comprising: a database containing encoded therein information associating one or more device handles with one or more peripheral devices; a first scanning module configured to scan a first portion of the database for one or more descriptor data entries associated with the desired peripheral device; a first processing module configured to determine one or more associated data entries of the database related to the one or more descriptor data entries; a second processing module configured to determine a second portion of the database based on the one or more associated data entries; a second scanning module configured to scan the second portion of the database for information indicative of the desired device handle; and a third processing module configured to identify the desired device handle based on the information indicative thereof.

In accordance with another aspect of the present invention, there is provided a computer readable medium having recorded thereon statements and instructions for execution by a computer to carry out a method for identifying a desired device handle in a host computer system, said computer configured to access a database containing encoded therein information associating one or more device handles with one or more peripheral devices, the desired device handle facilitating interaction with a desired peripheral device, the method comprising the steps of: scanning a first portion of the database for one or more descriptor data entries associated with the desired peripheral device; determining one or more associated data entries of the database related to the one or more descriptor data entries; determining a second portion of the database based on the one or more associated data entries; scanning the second portion of the database for information indicative of the desired device handle; and identifying the desired device handle based on the information indicative thereof.

In accordance with another aspect of the present invention, there is provided a software development kit comprising statements and instructions for execution by a computer to carry out a method for identifying a desired device handle in a host computer system, the desired device handle capable of facilitating interaction with a desired peripheral device, the method comprising the steps of: providing a database containing encoded therein information associating one or more device handles with one or more peripheral devices; scanning a first portion of the database for one or more descriptor data entries associated with the desired peripheral device; determining one or more associated data entries of the database related to the one or more descriptor data entries; determining a second portion of the database based on the one or more associated data entries; scanning the second portion of the database for information indicative of the desired device handle; and identifying the desired device handle based on the information indicative thereof.

BRIEF DESCRIPTION OF THE FIGURES

These and other features of the invention will become more apparent in the following detailed description in which reference is made to the appended drawings.

DETAILED DESCRIPTION OF THE INVENTION

Definitions

The term "device handle" is used to define a computing object, such as a database or data structure entry, filename or file handle, memory address, bus address, pointer, alias, or other object which can be invoked by components or modules of an appropriately configured computer system in a manner so as to interact or otherwise access a peripheral device or a portion thereof to which the device handle pertains. A device can be a USB™ peripheral device, an endpoint or collection of endpoints thereof; another removable or non-removable device such as computer memory, Firewire™ device, Bluetooth™ device, SCSI device, user interface, or storage medium; a virtual device; a software entity; or the like.

The term "database" refers to a structured collection of data stored by a computer system, for example in computer memory. Data entries stored in the database can be organized in the structure so that they are in relation to one another. For example, data entries can be organized in a tree, linked list, relational database, hierarchical database, network database, or other structure. A file system is considered herein as a database, with files and directories being data entries arranged in a predetermined relationship, for example a tree-like relationship. A database, as considered herein, may also refer to a collection of two or more separate database structures of similar or different type.

The term "encoded" is used to refer to a method of storing or presenting information or data, wherein the information is formatted, arranged, or otherwise configured in a particular manner. Encoded information may be structured according to one or more predetermined rules.

The term "peripheral device" is used to define a device that may be operatively interconnected with a computer system. For example, a peripheral device may be a memory storage device, communications device such as a wired or wireless modem, hub, auxiliary processing device, input/output device, or other device as would be understood by a worker skilled in the art.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a method and apparatus for identifying a desired device handle in a host computer system, the desired device handle capable of facilitating or providing for interaction with a desired peripheral device. The method and apparatus facilitate: providing a database containing encoded therein information associating one or more device handles with one or more peripheral devices; scanning a first portion of the database for one or more descriptor data entries associated with the desired peripheral device; determining one or more associated data entries of the database related to the one or more descriptor data entries; determining a second portion of the database based on the one or more associated data entries; scanning the second portion of the database for information indicative of the desired device handle; and identifying the desired device handle based on the information indicative thereof.

In some embodiments, the present invention provides for USB™ endpoint management in a Linux™ or similar system. When endpoints of a USB™ device are enumerated, the file system may create device handles, which may be similar to file handles in Linux™, for communication with the endpoints. In addition, updates may be made to a database, such as a structured list or file directory tree, associating the device handles with other USB™ device information, such as vendor ID, product ID, etc. According to embodiments of the present invention, device handles are associated with USB™ device endpoints by performing a search or scan of a first portion of the database for data entries related to the USB™ device information. After a desired data entry is found, an associated data entry is determined which may be indicative of a second portion of the database to be scanned for the desired device handle. For example, the desired data entry can be the contents of a file in a file directory tree, while the associated data entry can be the name of the file directory or folder containing that file. The second portion of the database may then be indicated for example as one or more directories in another part of the database having a name similar to that of the associated data entry. The second portion of the database is then scanned to determine information indicative of candidate device handles associated therewith, for example names of files or subdirectories contained in the one or more scanned directories comprising the second portion of the database. A desired device handle from the determined candidate device handles can then be identified, for example according to device-specific information.

In some embodiments, the present invention provides for USB™ endpoint management in an operating system such as Windows™, UNIX™, OS X™, or the like.

In some embodiments, the above-described scanning can be repeated multiple times, for example periodically and optionally indefinitely. This allows a host computer system or device driver or software developer kit thereof not only to discover the association between file handles and endpoints without probing the peripheral device, but also to detect changes in the association as they occur.

Method for Identifying a Desired Device Handle

Embodiments of the present invention provide a method for identifying a desired device handle in a host computer system, the device handle capable of facilitating or providing interaction with a desired peripheral device. The host computer system can be, for example, a personal computer, portable handheld computer system, or other type or computer system having a wired or wireless interface for connection to a peripheral device. The method may be implemented by the host computer system and/or by an appropriately configured microprocessor operatively coupled to memory and other hardware as appropriate. The method may execute automatically, semi-automatically, periodically, or the like. Potential interfaces include but are not limited to: USB™, Firewire™, Bluetooth™, ZigBee™, Ethernet, Analog interfaces, and the like. The peripheral device can be, for example, a memory storage device, communications device such as a wired or wireless modem, hub, auxiliary processing device, input/output device, or other device as would be understood by a worker skilled in the art.

In some embodiments, the host computer system is operated using a Linux™ or similar operating system, such as OS X™ or UNIX™. For example, Linux™ version 2.6 or similar Linux distributions available from RedHat™, Slackware™, Gentoo™, Debian™, Fedora™ and the like may incorporate features that may usefully interact with embodiments of the present invention.

Figure 1:
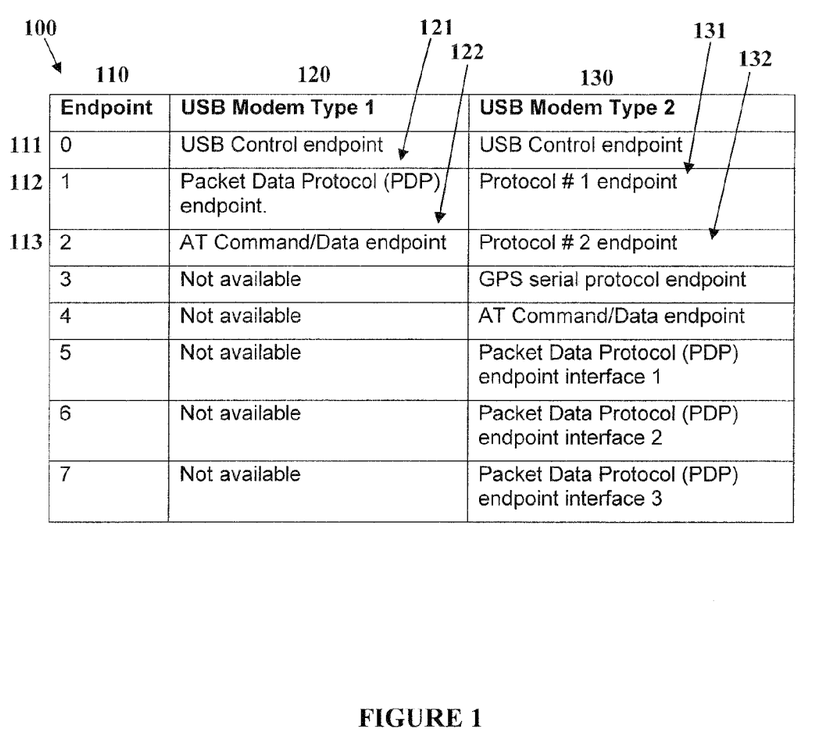
FIG. 1 illustrates example endpoint assignments for two USB™ modem devices.

In embodiments, the device handle of the desired peripheral device can be associated with one or more particular endpoints of a single- or multi-endpoint USB™ device, or similar device. For example, FIG. 1 illustrates two USB™ modems 120 and 130 with multiple endpoints, 111, 112, 113. A device handle of the desired USB™ device can be useful for accessing at least a desired one of these endpoints, such as a Packet Data Protocol (PDP) endpoint 121 or a protocol #1 endpoint 131, which may for example be a proprietary protocol for managing the USB™ device.

In embodiments of the invention, a device handle may be useful for accessing two or more endpoints. For example, writing to a device handle may be associated with transmitting data to an endpoint configured to receive information, while reading from the device handle may be associated with receiving data from an endpoint configured to transmit information. This and similar embodiments can be useful for current USB™ protocol versions which limit each endpoint to communication in a single direction only.

In embodiments, the device handle can be associated with a virtual device. For example, the virtual device can serve as an interface to software running on the host computer system or a remote computer system, or the device handle can be associated with another interface to one or more peripheral devices.

In some embodiments, the device handle can be associated with a device other than a USB™ device. For example, Firewire™, Bluetooth™, Ethernet, or other protocols may be the basis for communication with one or more peripheral devices.

In some embodiments, device handles can reside as file handles in the Linux™ device file system in the /dev directory contained within the Linux™ root directory. Within the /dev directory, each registered device interface is associated with a file handle. For example, one or more USB™ endpoints can be associated with file handles of the form: /dev/ttyUSBn. Here, the "n" in "USBn" is a number assigned by Linux™ during or after enumeration. If no other USB™ device handles appear in the /dev directory, "n" begins at zero for the first endpoint enumerated, and increases sequentially for each successive endpoint that is enumerated. However, if other USB™ device handles appear, the numbers corresponding to those endpoints are skipped during enumeration, such that no two USB™ endpoints have the same number "n" assigned.

For example, the USB™ modem type 1 illustrated in FIG. 1 may have three endpoints, each associated with a separate file handle. Therefore, if this were the first device enumerated, the device file system could show:

/dev/ttyUSB0 /dev/ttyUSB1 /dev/ttyUSB2 as device handles for each of the USB™ modem endpoints. That is, Endpoint 1 is accessible through file handle /dev/ttyUSB0; Endpoint 2 is accessible through file handle /dev/ttyUSB1; and Endpoint 3 is accessible through file handle /dev/ttyUSB2.

Alternatively, if another USB™ device having a single endpoint were already present and associated with /dev/ttyUSB1, the device file system could show:

/dev/ttyUSB0 /dev/ttyUSB2 /dev/ttyUSB3 as device handles for each of the USB™ modem endpoints. That is, Endpoint 1 is accessible through file handle /dev/ttyUSB0; Endpoint 2 is accessible through file handle /dev/ttyUSB2; and Endpoint 3 is accessible through file handle /dev/ttyUSB3.

In some embodiments of the present invention, the following rules may apply to the way some such Linux™ systems assign the number n to the device handle. Rule 1: tty numbers are allocated in ascending order of USB™ endpoints. Rule 2: there is no fixed relationship between the value of "n" in a ttyUSBn handle and the endpoint it represents. Rule 3: once Linux™ has allocated a value of "n" to a device handle, that value is not used by another similar device handle. Rule 4: if Linux™ encounters one or more "unavailable" values of "n" before it has finished creating file handles for each endpoint, it skips the unavailable ones, resuming its allocation with the next available one.

In some embodiments, the above-described behaviour results in endpoints of a device having ordinally successive endpoints. For example, if all endpoints of a device are enumerated at about the same time, then the first endpoint to be enumerated will receive the first available endpoint number, the second endpoint will receive the second available endpoint number, and so on. For a given device, the order of enumeration of endpoints may be fixed. Therefore, if all the endpoint numbers associated with such as device can be identified, then supplementary information may be used to further identify each endpoint.

It is noted that the above rules which are illustrative of some embodiments of the present invention, are in accordance with certain versions of Linux™, and are hence subject to change as Linux™ evolves. However, some embodiments of the present invention are intended to be operable with future versions of Linux™, and/or with other operating systems, provided such versions or systems are amenable to methods, apparatus, computer program products, or the like, described herein with respect to the present invention. For example, an operating system equipped with a pre-existing or specially provided, appropriately configured database may be operable with various embodiments of the present invention.

In embodiments of the present invention, there may not be a one-to-one correspondence between device handles and endpoints, or other pipes or communication channels. For example, it is contemplated that a single device handle may be associated with multiple USB™ endpoints, such as an incoming and an outgoing endpoint, or a single endpoint may be associated with multiple device handles if the operating system or device interface allows such correlation.

In embodiments of the present invention, other device handle naming conventions may be present. Device handles can be associated with communication channels in a variety of ways, for example deterministically, randomly, hierarchically, or the like. However, device handles are typically uniquely identifiable in some manner, for example due to a combination of name, location, and the like. When device handles are allocated dynamically, the same device handle may not always be associated with the same communication channel, since there is a possibility that that device handle may already have been allocated to another communication channel. Rather, device handle allocation may be dependent on previous allocation history.

In some embodiments of the present invention, when a peripheral device is connected to a host computer system, the host computer system may automatically detect its presence and proceed to enumerate that peripheral device. During enumeration, the host computer system may extract a description of the number and types of endpoints of the peripheral device and then install a suitable driver designed to offer communications between that peripheral device and the host computer system. Enumeration can occur once or several times depending upon how the peripheral device is used. For example, plugging a peripheral device into a USB™ port connected to the host computer system may force an enumeration to take place. If the peripheral device subsequently reboots, becomes disconnected then reconnected, another enumeration may take place.

In embodiments of the present invention, other types of peripheral devices can be detected upon connection to the host computer system, and one or more device handles can be created for interaction therewith. Alternatively, device handles can reside permanently or semi-permanently in the host computer system, the status of which may change upon connection or disconnection of the associated peripheral device.

Database

Embodiments of the present invention provide a database containing information associating device handles and peripheral devices. The database may be provided wholly by the present invention, or if an appropriate database already exists, the present invention may use the existing database as it is or an augmented or modified version thereof.

Figure 2:
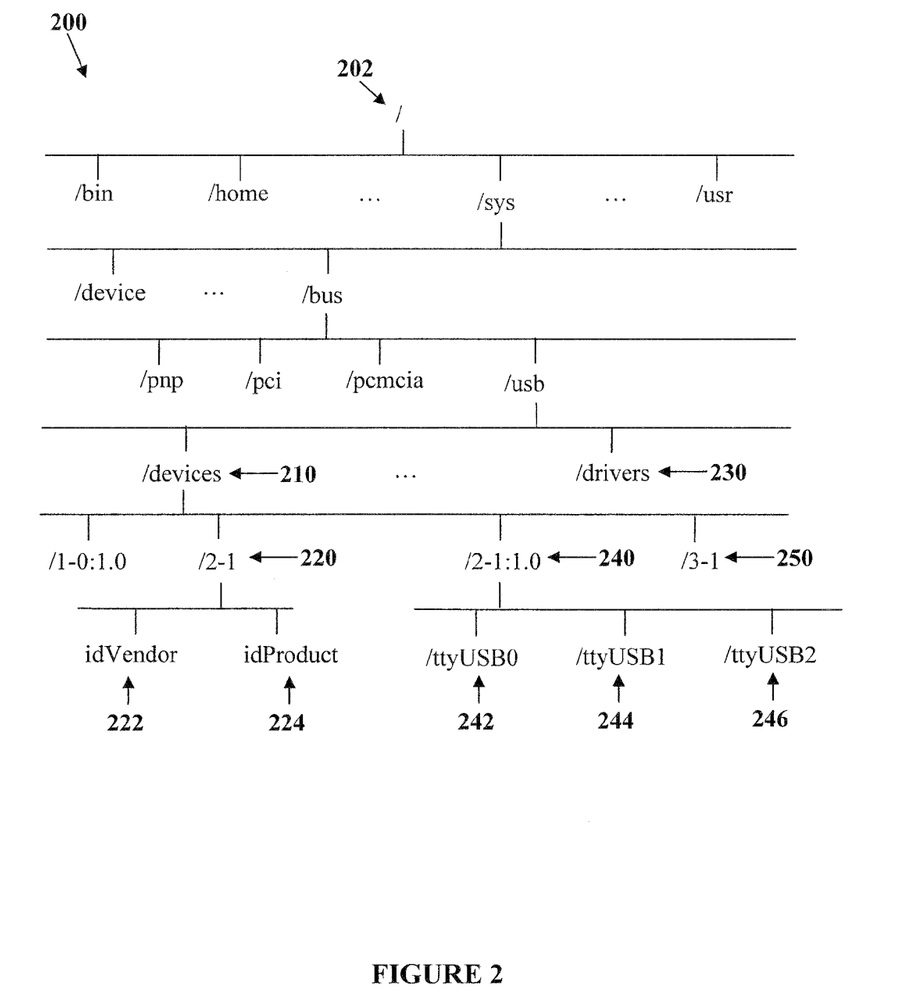
FIG. 2 illustrates an example tree representation of a Linux™ sysfs file system.

For example, as of the introduction of kernel version 2.6, Linux™ is typically configured with a file system known as "sysfs". This file system reflects the hardware configuration of the system using a hierarchy of directories and files. Names and contents of such files and directories encode information about the hardware configuration, as does the structural relationship of files and directories. FIG. 2 illustrates a portion of an example sysfs file system 200. The file system is a hierarchical tree structure, comprising an arrangement of nested directories, with files inside directories. Portions of the sysfs file system represent a database which may be appropriate for use with embodiments of the present invention.

In FIG. 2, directories are identified with a "/" character in front of their name. Names without the "/" are plain-text files. The sysfs file system can be updated dynamically by the sysfs module within the Linux™ kernel as peripheral devices are added and removed from the host computer system. In addition, the hotplug module and other modules, utilities or programs provided or custom-made for use with Linux™ can be used in conjunction with automatic updating.

The sysfs file system contains information associating device handles and peripheral devices in a hierarchical manner. For example, information identifying peripheral devices is stored in text files in specific locations within the sysfs file system 200. Product ID, Vendor ID, Serial number, configuration information, and other information can be stored in the sysfs file system in this manner in one or more text files. The directory of file system path containing these files is structured according to predetermined rules. This structure can be viewed as encoded information relating the peripheral device associated with the text files and with other information, such as information associating the peripheral device with file handles thereof.

FIG. 2 illustrates an example sysfs file system structure 200. Here, two data files labelled idVendor 222 and idProduct 224 are present, which may contain Vendor ID and Product ID codes obtained during enumeration of a peripheral device, for example downloaded from memory residing on the peripheral device. These ID codes can be, or can be related to, descriptor data entries for the associated peripheral device. The idVendor and idProduct data files 222, 224 reside within a named subdirectory, in this case named "/2-1," 220 and thus the contents of the idVendor and idProduct files 222, 224 are associated with this subdirectory 220 name. This subdirectory name 220 is further associated with other named subdirectories, via the sharing of portions of the names thereof, and via predetermined path constraints. For example, another subdirectory, named "/2-1:1.0" 240 resides within the /usr/bus/usb/devices directory 210. Since the first portion of the name coincides with the previous "/2-1" subdirectory 220, an association exists. The /2-1:1.0 subdirectory 240 is further associated with device handle names ttyUSB0, ttyUSB1 and ttyUSB2, 242, 244, 246, in that these names appear as names of (possibly empty) subdirectories within the /2-1:1.0 subdirectory 240.

In the above example, a chain or group of at least three associations were used to link the contents of idVendor and idProduct files 222, 224 to a plurality of device handles. Such associations are based on an understanding of how the sysfs file system is generated, for example how and where files and directories are created, and the naming and structuring that rules followed. It is noted that a chain or group of associations implies one or more compound associations, which are also considered associations in embodiments of the present invention.

The sysfs file system is typically navigable with standard operating system commands, and the files therein typically readable as simple text files. However, it is contemplated that other databases according to embodiments of the present invention may not be accessible in this manner. For example, data entries within a database according to the present invention may be encoded in ASCII, binary, hexadecimal, or the like, and may be encrypted, encoded, compressed, or the like. Navigation, browsing or querying of the database may be accessible at the command line, through dedicated software, or through automated authorized routines. The database may resemble a file system, SQL or similar database, data structure such as a linked list, or the like. Furthermore, the database may be stored locally, remotely, or a combination of both. Other aspects of a database which may be appropriate for use with embodiments of the present invention would be understood by a worker skilled in the art.

Associations in a database according to embodiments of the present invention can be generally achieved for example through pointers, links, shared labels, shared groupings, tree branches, or the like. In general two data entries in a database can be associated if there is a predictable or quasi-predictable intrinsic or extrinsic relationship between them. Such relationships can be explicit within the database or based on predetermined known rules about the database.

Embodiments of the present invention generally provide for utilizing the provided database for identifying desired device handles, for example by associating device handles with information found in the database, using the database to facilitate or narrow searching for device handles, or the like. Methods according to such embodiments of the present invention are provided herein.

Scanning a First Portion of the Database

Embodiments of the present invention enable scanning or searching of a first portion of the provided database for descriptor data entries associated with the desired peripheral device. For example, data corresponding to descriptor information associated with a device, such as Vendor IDs, Product IDs, serial numbers, addresses, and the like can be provided and a portion of the database known to potentially contain such information can be scanned or searched. In some embodiments, the scan or search comprises seeking a specific data entry. In embodiments, the scan or search comprises seeking a data entry within a range or class. For example, wildcards or data masks can be used to return data entries which only partially correspond to a desired value. In embodiments, hash tables, checksums or other means as would be understood in the art can further be used to facilitate scanning or searching.

In embodiments of the present invention, scanning or searching can be done through a sequence of adaptive or non-adaptive queries, by applying a sequence of one or more filters, or other methods.

In embodiments of the present invention, scanning or searching can comprise one or more database queries. Such queries can for example include predefined operators such as Boolean operators, positional or search term relationship operators, search range or target location operators, numerical range operators, special operators, or the like.

Returning to the example sysfs file system 200 of FIG. 2, the first portion of the database to be scanned may be the two directories named 2-1 220 and 3-1 250. The scanning algorithm may, for example, enter each directory and dump the contents of the idVendor file therein, for example file 222. These contents may be compared to the contents of a predetermined list of target Vendor IDs denoting a desired class of peripheral devices, for example.

In some embodiments, alternative methods such as vendor-specific or device-specific commands can be used to determine device characteristics. For example the host computer can query a peripheral device to determine capabilities following enumeration, using direct interrogation or by sending specific commands that elicit a response indicative of the device characteristics. The results of the query can be indicative of the device type and/or capabilities, which can be used to configure subsequent actions.

In embodiments, if the scan is indicative that no instance of a desired peripheral device is apparent, scanning may be repeated immediately or after a predetermined delay, or temporarily suspended until an event such as insertion of a new peripheral device or host computer system restart occurs. If-then statements, polling or interrupt-based program structures, or the like can be implemented to prepare for this and other contingencies.

Determining Associated Data Entries

Embodiments of the present invention provide for determining one or more associated data entries of the database related to the one or more descriptor data entries, determined for example as described above. For example, once one or more descriptor data entries associated with the desired peripheral device are determined, one or more directly or indirectly associated data entries in the database can be determined based thereon. The nature of the association is typically dependent upon the structure of the database. For example, explicit or implicit links, pointers, shared portions of data entries, or the like can form associations, as discussed previously.

Returning to the example sysfs file system 200 of FIG. 2, if the idVendor file contains data associated with a desired peripheral device, the subdirectory name "/2-1" 220 can be determined as an associated data entry related to the contents of the idVendor file 222, which is in turn associated with the desired peripheral device.

Determining a Second Portion of the Database

Embodiments of the present invention provide for determining a second portion of the database based on the one or more associated data entries. For example, once one or more associated data entries are determined, one or more second portions of the database can be determined based thereon. The basis for such a determination is typically dependent upon the structure of the database. Explicit or implicit links, pointers, correspondence between named or otherwise labelled portions of the database and portions of the associated data entries, or the like can form such a basis, for example.

In embodiments of the present invention, associated data entries are determined based on pre-existing implicit or explicit relationships between data entries in the database. Such relationships may be based on empirical knowledge such as existing database structure or statistics thereof, or based on known or perceived rules about behaviour of the database, for example based on code used in database construction, or models of the database.

Returning to the example sysfs file system 200 of FIG. 2, the associated data entry "/2-1" 220 can be used to determine the second portion of the database to be any directories residing in the /usr/bus/usb/devices directory which have the form /2-1:x.y, where x and y are any value, for example /2-1:1.0 240.

Scanning the Second Portion of the Database

Embodiments of the present invention provide for scanning or searching the second portion of the database for information indicative of the desired device handle of the desired peripheral device. For example, data entries within the second portion of the database having a specific structure or format may be sought out during the scan or search. In some embodiments, the scan or search comprises seeking a specific data entry. In embodiments, the scan or search comprises seeking a data entry within a range or class. For example, wildcards or data masks can be used to return data entries which only partially correspond to a desired value. In embodiments, hash tables, checksums or other means as would be understood in the art can further be used to facilitate scanning or searching.

In embodiments of the present invention, scanning or searching can be done through a sequence of adaptive or non-adaptive queries, by applying a sequence of one or more filters, database queries, or the like.

Returning to the example sysfs file system 200 of FIG. 2, a scan may be performed of the /2-1:1.0 240 directory, the scan configured to return the names of all subdirectories of the form /ttyUSBn, where n is any value, for example 242, 244, 246. These names are indicative of the desired device handle of the desired peripheral device in that one or more of said names is the same as the name of the desired device handle to be found in the /dev directory.

In embodiments of the present invention, the information indicative of the desired device handle may not be a label exactly matching the name or location of the device handle, but may be associated with the desired device handle in a predetermined or known manner, for example through pointers, lookup tables, or the like. A worker skilled in the art would understand how to discover and apply implicit or explicit relationships between the information indicative of the desired device handle and the desired device handle itself, and how to automate such tasks in embodiments of the present invention if desired.

In embodiments of the present invention, multiple operations such as determining one or more associated data entries of the database related to the one or more descriptor data entries, determining a second portion of the database based on the one or more associated data entries, and scanning the second portion of the database for information indicative of the desired device handle of the desired peripheral device can be replaced by a single general step of determining information indicative of the desired device handle based on the one or more descriptor data entries. Such a determination can optionally include determinations of associated data entries and/or portions of the database, and can further optionally include scanning, searching or otherwise selecting or retrieving information from the database or determined portions thereof, said information indicative of the desired device handle.

Identifying the Desired Device Handle

Embodiments of the present invention provide for identifying the desired device handle based on the information indicative thereof. For example, the information indicative of the device handle can indicate one or more locations and/or partial or full names of one or more device handles. At least one of the indicated device handles can be the desired device handle.

In some embodiments, the information indicative of the desired device handle can be incomplete, for example indicating two or more device handles, only one of which is the desired device handle. In this case, supplementary information can be used to aid in indicating the desired device handle, for example via a database query or similar operation. For example, the descriptor data entries such as the Vendor ID and Product ID can be used to generate a database query or lookup operation, which can return supplementary information indicative of which of the two or more device handles is the desired device handle. This query is not necessarily directed toward the same database as that containing information associating device handles and peripheral devices. Rather, it can be a separate database associated with one or more files stored on the host computer system or accessible by the host computer system, for example.

In some embodiments, supplementary information can be obtained by interaction with the peripheral device. For example, interaction may comprise querying or interrogation of the peripheral device, or transmitting a message to the device, possibly using a different device handle, wherein the message is configured to elicit a predetermined response. For example, device-specific commands can be performed for this purpose.

Returning to the example sysfs file system 200 of FIG. 2, directory names ttyUSB0, ttyUSB1 and ttyUSB2 242, 244, 246 can comprise information indicative of the desired device handle, for example in the sense that a device handle in the /dev directory bearing one of these names is the desired device handle. In order to select from these three, the Vendor ID and/or Product ID previously obtained can be used to determine the ordering of USB™ endpoints for this USB™ device, and hence which device handle and/or endpoint is the desired one. For example, referring now to FIG. 1, if the Vendor ID and/or Product ID indicate that the USB™ device is a USB™ Modem Type 1 120, and the desired endpoint is the AT command/data endpoint 122, then the third device handle 113 in the list will be the desired device handle, that is ttyUSB2. If, on the other hand, the Vendor ID and/or Product ID indicate that the USB™ device is a USB™ Modem Type 2 130, and the desired endpoint is the Protocol #1 endpoint 131, then the second device handle 112 in the list will be the desired device handle, that is ttyUSB1.

We note that alternate scenarios to that of FIG. 2 may exist. For example, device handle numbers do not always increase sequentially; information indicative of the desired device handle could alternatively comprise a list such as ttyUSB0, ttyUSB2, ttyUSB5, etc. In this case, the second device handle is ttyUSB2, and the third device handle is ttyUSB5. That is, it is ordinal numbers, not cardinal numbers, which are relevant to selecting the desired endpoint in the above scenario, and in other embodiments of the present invention which substantially correspond with this scenario.

In embodiments of the present invention, identifying the desired device handle based on the information indicative thereof may not always require a database query or other look-up operation. For example, if multiple potential desired device handles are indicated, it can be possible to identify, from the plurality, one or more desired device handles based on predetermined rules. For example, the $i^{th}$ ordinally numbered device handle can be identified as the desired device handle, where i is a predetermined value. In another example, the desired device handle can be identified by comparing potential device handles with a desired name, and selecting one which closely matches the desired name. Other information, such as the time or order in which the potential device handles appeared, history of appearance and/or disappearance of the potential device handles, and the like can be used to aid in identification of the desired device handle.

In some embodiments, if more than one device handle can function as the desired device handle, the desired device handle can be selected arbitrarily, for example randomly or deterministically.

In embodiments, there may be two or more desired device handles. For example, a desired device handle useful for sending information to the device, and a device handle useful for receiving information from the device. In this case, each desired device handle may be identified separately. Alternatively, the desired device handles may be identified in combination. For example, information obtained during identification of one device handle may be used to facilitate identification of another device handle. As another example, the desired device handles may be identified in combination, for example if they are known to reside in the same directory or portion of the second database.

In some embodiments, two or more desired device endpoints may be accessible using the same device handle, or using related device handles. In this case, one or more desired device handles can be determined, for example as described above, in order to facilitate communication with the two or more desired device endpoints.

Apparatus for Identifying a Desired Device Handle

The present invention provides an apparatus for identifying a desired device handle in a host computer system. Potential embodiments of such an apparatus are discussed herein.

In some embodiments, an apparatus for identifying a desired device handle generally comprises a database, means for interacting with the database such as a computing module configured to scan the database, and means for processing information, such as a computing module. A computing module may be a scanning module, a processing module, another type of module, or a combination thereof. Such a computing module may comprise all or a portion of a general-purpose or special purpose computer or collection of computers, computing devices, microprocessors or the like configured for the task or tasks at hand. For example, a general-purpose computer may be configured, in accordance with appropriate software and/or firmware, into one or more interrelated computing modules such as scanning modules and/or processing modules. Computing modules may be operatively coupled to each other and/or to other computer hardware, software or firmware. In some embodiments, a computing module may be associated with one or more computer programs or portions thereof, along with one or more triggers which cause the computing module to automatically execute one or more operations thereof when one or more predetermined conditions within the host computer are met.

In some embodiments, an apparatus for identifying a desired device handle can comprise portions of a general-purpose computer such as a personal computer, configured for example through software into one or more computing modules for performing tasks according to embodiments of the present invention. Such computing modules can comprise one or more elements such as memory, processing capabilities, user interface capabilities, networking capabilities, and the like. For example, database data can be provided on a hard disk or other computer readable medium, the database further enabled through a processor, operating system, software, program memory, data cache, and the like. As another example, scanning and/or processing capabilities can be provided through computer components configured and operating according to software. It would be understood by a worker skilled in the art how to configure a general-purpose computer to perform as a specified apparatus.

In some embodiments, an apparatus for identifying a desired device handle can comprise plural electronic devices operatively coupled together. For example, a general-purpose computer and a remote computer operatively coupled thereto, for example through a network, can be configured as an apparatus according to embodiments of the present invention. As another example, an apparatus for identifying a desired device handle may comprise one or more peripheral devices, possibly including the desired peripheral device. For example, the desired peripheral device may, during enumeration or other initialization, provide instructions for configuring a general-purpose computer for purposes of the present invention.

Other apparatus directed toward embodiments of the present invention would be understood by a worker skilled in the art. For example, electronics hardware, either hard-coded or configured through firmware or software, can be incorporated into or otherwise interfaced with the host computer system. Portions of the host computer system itself can be permanently or temporarily configured to provide an apparatus for identifying a desired device handle, either completely contained within the host computer system or supplemented with other apparatus.

The invention will now be described with reference to specific examples. It will be understood that the following examples are intended to describe embodiments of the invention and are not intended to limit the invention in any way.

EXAMPLES

Example 1

In an embodiment of the present invention, a method is provided for identifying a desired device handle in a Linux™ system, the desired device handle associated with a USB™ wireless modem of a predetermined type. The Linux™ system includes a sysfs file system as described herein. Similar embodiments can be used with other USB™ devices, or non-USB™ devices.

In the present embodiment, a wireless modem is provided as a peripheral device with a USB™ interface for interaction with the host computer system. This interface provides a number of unidirectional serial interfaces between the USB™ peripheral device and host computer system, in the form of USB™ endpoints. These endpoints are uniquely numbered and the number is significant because it is the identifier that must be used whenever a higher layer protocol wishes to exchange traffic with the modem. Although the type of traffic carried via a particular endpoint may be configurable within the modems, in practice the endpoint number itself is sufficient to identify the service available at the modem end.

For example, FIG. 1 illustrates endpoint assignments for two types of USB™ modems 120, 130. For example, the protocol #1 endpoint 131 can carry Control and Status messages which can be used for the purpose of controlling, monitoring and configuring USB™ modems. A software developer kit (SDK) can, for example, so use such a protocol for interfacing with, configuring, and/or managing the modem. Such a SDK can be provided with the modem, embedded in the operating system, or downloadable to the host computer, for example.

In one embodiment, a desired endpoint can be determined by inspecting information obtained during enumeration of the USB™ peripheral device, such as a Vendor ID or Product ID. For example, the combined Vendor and Product IDs can be composed into a database query which searches a known list of ID combinations. If the combination is found, the result of the database query can contain an indication of endpoints for that device and their associated uses.

In one embodiment, a standard protocol such as a TTY protocol can be used for communication with the modem. Therefore, once a Linux™ file handle/device handle has been associated with one or more desired endpoints of a desired device, the file handle can be opened and read from/written to using Linux™ system calls such as "read( )" and "write( )" A device driver can be configured to enable converting between USB™ communication protocol and the standard protocol such as TTY.

According to the present example, an indication of what type of USB™ modem corresponds to the desired peripheral device can first be provided. A list of desired Vendor IDs and/or Product IDs can be provided for this purpose. Such USB™ descriptors are programmed into a device during manufacture. Descriptors are typically allocated to each company by the USB™ governing body.

Alternatively, or in addition to the above-described use of Vendor and Product IDs, the type of USB™ modem and/or modem capabilities can be determined using other methods, for example using vendor-specific or device-specific commands, queries, or the like.

Continuing with the present example, a scan or search for one or more desired Vendor IDs and product IDs as provided above can be performed on a first portion of the sysfs file system. The first portion in this example is all directories of the form /x-y residing within /sys/bus/usb/devices 210, for example /2-1 220 and /3-1 250. The scan comprises entering each directory of the form /x-y as above, and dumping the contents of the idVendor file and compares the contents with the pre-configured list of desired Vendor IDs.

If the contents of the idVendor file matches that of a desired Vendor ID, the scan makes note of the 2-1 directory name for use as a prefix in the remainder of the search.

Continuing with the above example, now that the scan has found a directory containing a file with one of the desired Vendor IDs it begins searching, for example /sys/bus/usb/devices for directories whose name begins with the name of the directory 2-1, noted above. In the example of FIG. 2 it will find the directory /sys/bus/usb/devices/2-1:1.0.

In this example there is only one directory whose name begins with "2-1". This may occur, for example, if the modem's USB™ descriptor is of a type called "composite." In the case of a composite descriptor, all USB™ endpoints may be enumerated together in a single interface, the effect being that all ttyUSBn device handles appear in the same directory, that is, the one identified above. For other modem types, USB™ descriptors may be of the non-composite type with the result that there will be one ttyUSBn per directory and several directories whose name begins with "2-1". To accommodate both composite and non-composite types, the scan may be configured to continue this portion of the search until it has examined all the directories it finds in /sys/bus/usb/devices. In other words, it doesn't just stop after the first directory it finds matching the prefix "2-1".

Continuing with the above example, the scan then builds a list of /ttyUSBns it finds in the directories scanned, i.e. those beginning with prefix "2-1". In the example of FIG. 2, the list would contain ttyUSB0, ttyUSB1, ttyUSB2. Device handles for these ttys can be found in /dev.

In addition, the scan of the present example also makes note of the Vendor ID/Product ID combination for the modem. Upper layer software can access the Product ID through an operating system package function call to determine a modem family to use, thus which endpoint to use for desired communications. For example, a database look-up can indicate that to communicate with the Protocol #1 endpoint 131 (the second endpoint), the second device handle in the list, ttyUSB1 should be used.

Example 2

Figure 3:
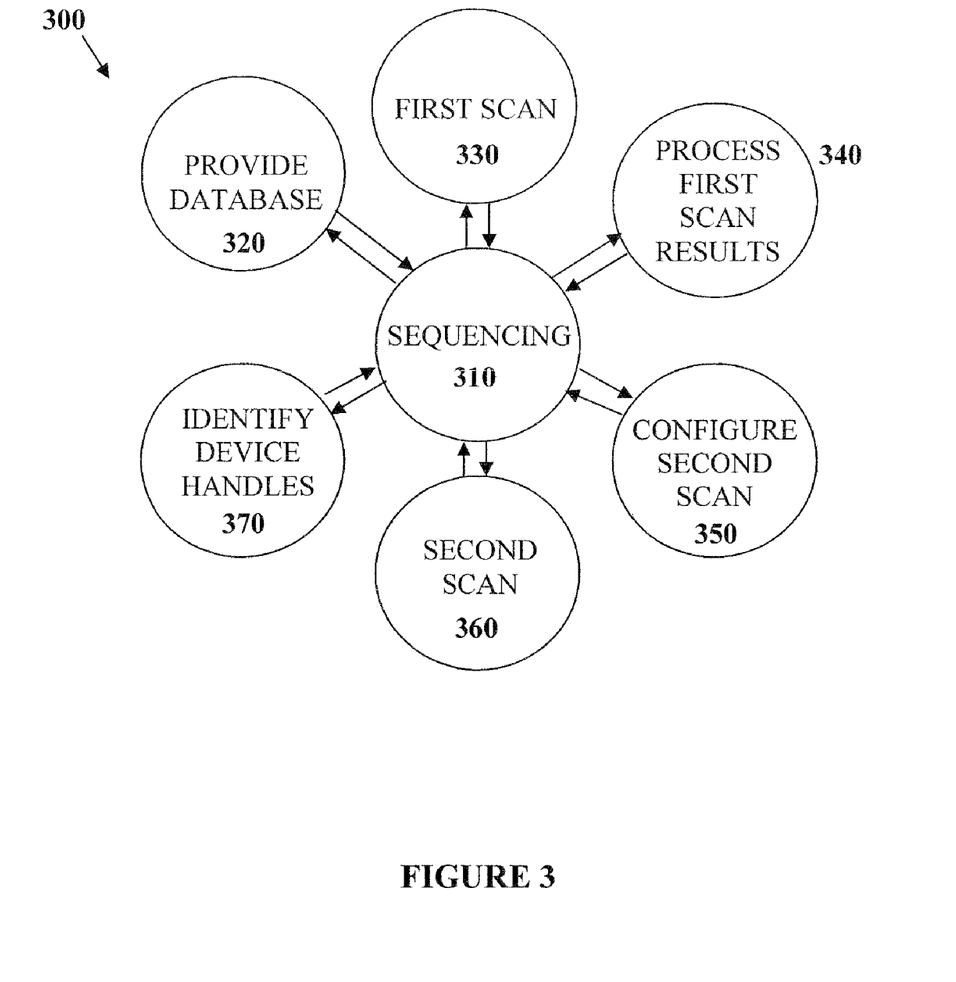
FIG. 3 illustrates a method for identifying a desired device handle in accordance with embodiments of the present invention.

FIG. 3 illustrates a method 300 for identifying a desired device handle associated with a peripheral device, according to an embodiment of the present invention.

The method 300 illustrated in FIG. 3 includes the step of providing a database 320, containing encoded therein information associating one or more device handles with one or more peripheral devices. For example, the database can be pre-existing, and provided by facilitating access thereto, for example, the Linux™ sysfs file system can be provided in this manner.

The method 300 illustrated in FIG. 3 further includes the step of performing a first scan 330, which scans a first portion of the database for one or more descriptor data entries associated with the desired peripheral device.

The method 300 illustrated in FIG. 3 further includes the step of processing the first scan results 340, thereby determining one or more associated data entries of the database related to the one or more descriptor data entries.

The method 300 illustrated in FIG. 3 further includes the step of configuring a second scan 350, thereby determining a second portion of the database based on the one or more associated data entries.

The method 300 illustrated in FIG. 3 further includes the step of performing a second scan 360, which scans the second portion of the database for information indicative of the desired device handle.

The method 300 illustrated in FIG. 3 further includes the step of identifying device handles 370, which includes identifying the desired device handle based on the information indicative thereof.

The method 300 illustrated in FIG. 3 further includes a sequencing step 310 for managing steps such as the above-described steps 320, 330, 340, 350, 360, and 370 according to embodiments of the present invention. The sequencing step 310 can initiate and/or manage steps in a desired order in accordance with embodiments of the present invention. Upon completion, each step can be followed by a sequencing step so that another step can be initiated. In this manner, steps can be repeated in different desired orders and/or looped to provide repeated scans and processing steps. For example, steps can proceed in the order: 310, 320, 310, 330, 310, 340, 310, 350, 310, 360, 310 and 370. As another example, steps can proceed in the order: 310, 320, 310, 330, 310, 340, 310, 330, 310, 340, 310, 350, 310, 360, 310 and 370. Other variations which are in accordance with the present invention would be understood by a worker skilled in the art.

Figure 4:
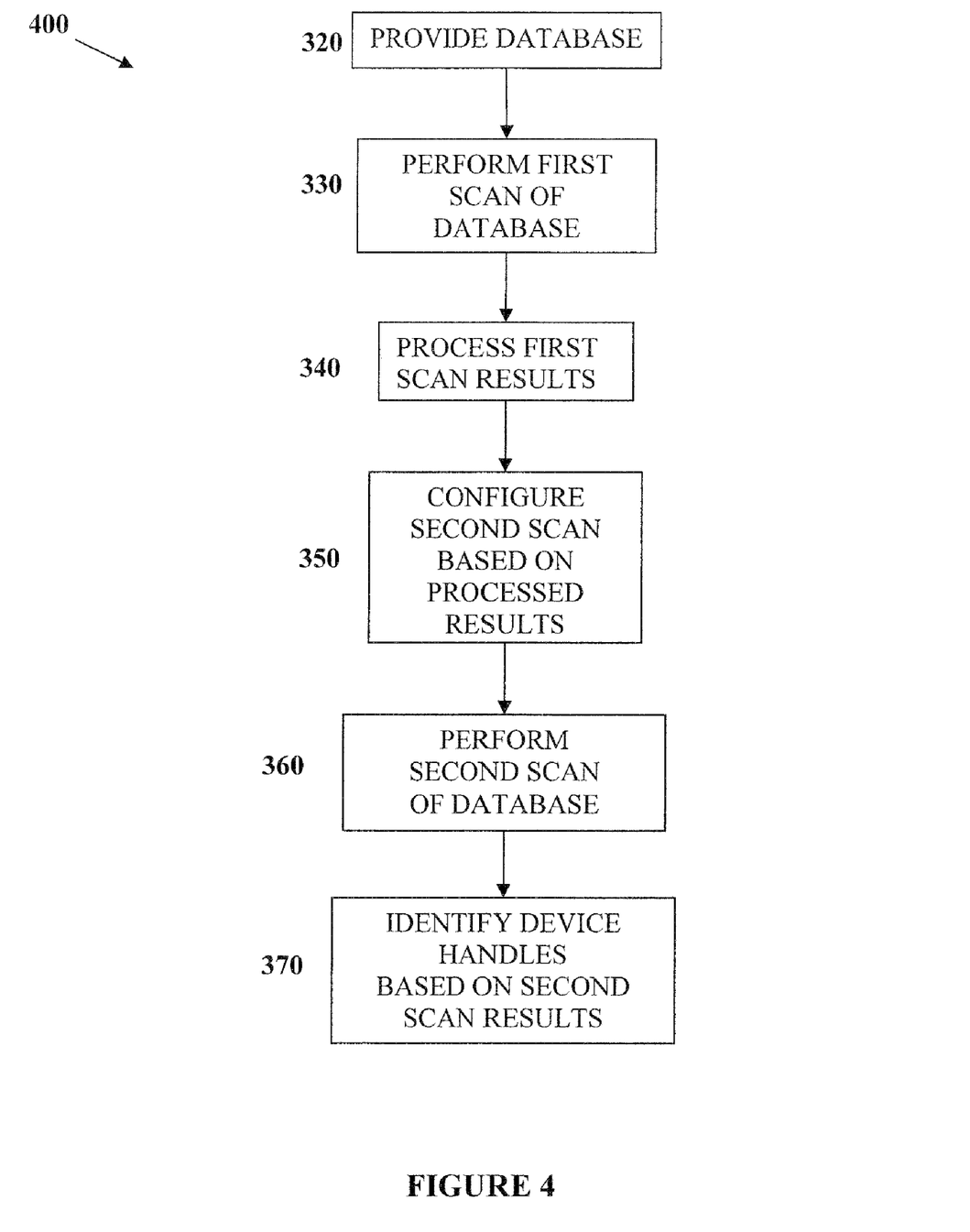
FIG. 4 illustrates a method for identifying a desired device handle in accordance with embodiments of the present invention.

An alternative method 400 illustrated in FIG. 4 illustrates execution of the above-described steps 320, 330, 340, 350, 360, and 370 according to an embodiment of the present invention. Rather than explicitly relying on a sequencing the steps are performed in the order presented.

Example 3

Figure 5:
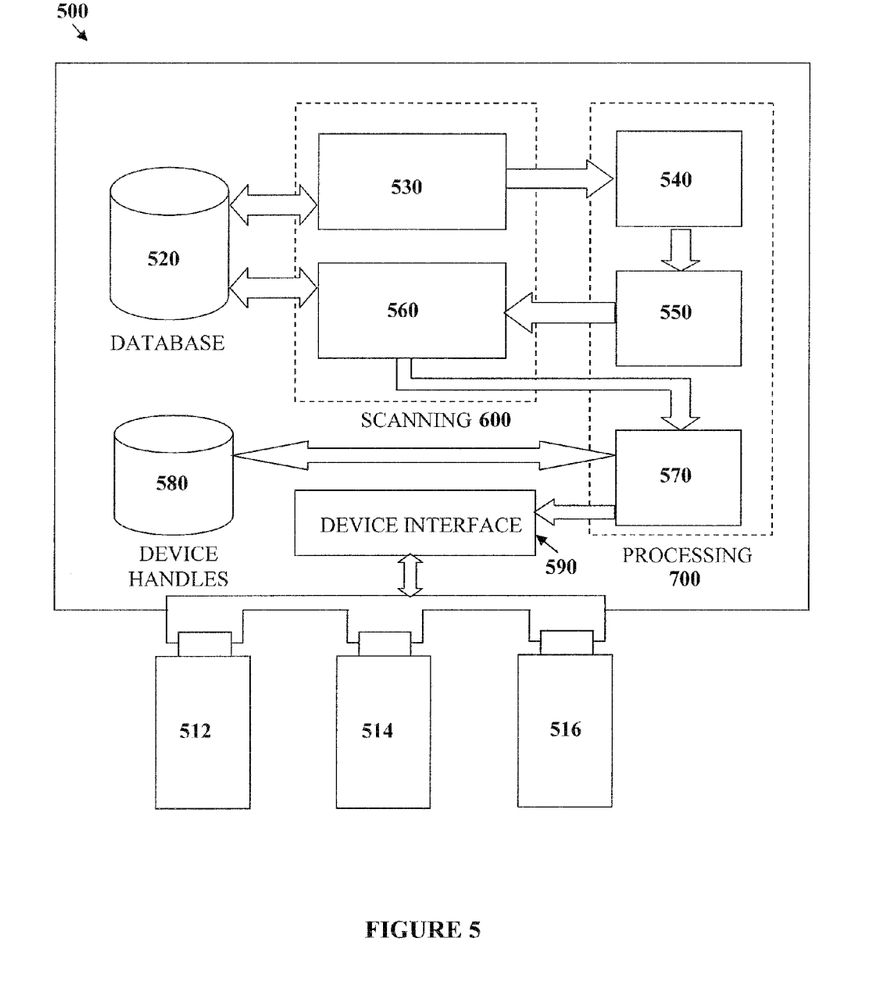
FIG. 5 illustrates an apparatus for identifying a desired device handle in accordance with embodiments of the present invention.

FIG. 5 illustrates an apparatus 500 for identifying a desired device handle associated with a desired peripheral device, according to an embodiment of the present invention. The desired peripheral device can be one of several peripheral devices 512, 514, 516, operatively coupled to the apparatus 500 via a device interface 590. The apparatus 500 may, in embodiments of the present invention, also function as a personal computer, communications device or other device, and may contain other elements or configurations. Rather than illustrating the apparatus 500 as a personal computer or other device configured according to the present invention, only aspects immediately relevant to embodiments of the present invention are illustrated in FIG. 5.

The apparatus 500 illustrated in FIG. 5 includes a database 520 containing encoded therein information associating one or more device handles with one or more peripheral devices.

The apparatus 500 illustrated in FIG. 5 further includes a first scanning module 530 operatively coupled to the database 520, the first scanning module 530 configured to scan a first portion of the database 520 for one or more descriptor data entries associated with the desired peripheral device.

The apparatus 500 illustrated in FIG. 5 further includes a first processing module 540 operatively coupled to the first scanning module 530, the first processing module 540 configured to determine one or more associated data entries of the database 520 related to the one or more descriptor data entries.

The apparatus 500 illustrated in FIG. 5 further includes a second processing module 550 operatively coupled to the first processing module 540, the second processing module 550 configured to determine a second portion of the database 520 based on the one or more associated data entries.

The apparatus 500 illustrated in FIG. 5 further includes a second scanning module 560 operatively coupled to the second processing module 550, the second scanning module 560 configured to scan the second portion of the database 520 for information indicative of the desired device handle.

The apparatus 500 illustrated in FIG. 5 further includes a third processing module 570 operatively coupled to the second scanning module 560, and to a stored list of device handles 580. The stored list of device handles 580 contains device handles for communicating with one of more of the attached peripheral devices 512, 514, 516 via the device interface 590. The third processing module 570 is configured to identify the desired device handle based on the information indicative thereof.

The desired device handle identified by the third processing module may be provided to the device interface 590, and subsequently used for communication with the desired device, as would be understood by a worker skilled in the art.

The apparatus 500 may optionally comprise a general scanning module 600, operating as the first scanning module 530 and the second scanning module 560, as appropriate. The general scanning module 600 may be operatively coupled as shown to the database 520 and the first, second and third processing modules 540, 550, 570.

The apparatus 500 may optionally comprise a general processing module 700, operating as the first processing module 540, second processing module 550, and third processing module 570, as appropriate. The general processing module 700 may be operatively coupled as shown to the first and second scanning modules 530, 560, and/or general scanning module 600, and also to the stored list of device handles 580.

Additional Variations

In some instances, there may be no way to guarantee that endpoint-to-device handle mapping will remain constant over time. In this case, embodiments of the present invention may be configured to run periodically in order to update itself with any changes in the system configuration. A mapping can be rebuilt with each scan, and if a difference is found from one scan to the next, the file descriptors previously collected can be immediately suspended or invalidated. This can help ensure that subsequent read/write attempts will fail and this failure will send a signal to the upper layers within the SDK that they must suspend temporarily until a new modem is discovered and its endpoint-to-device handle mapping is constructed.

In one embodiment, if a modem has not yet been detected, then any attempt by the higher layers to communicate with the modem may be returned with an error condition. Alternatively, if a peripheral device matching the Vendor ID has been detected, the upper layer software may determine a desired endpoint of the peripheral device from the Product ID, for example through a database query operation. This endpoint number may then be used to open a read/write session with the modem, via an associated device handle.

When the host computer system's read/write functions are called, a database query can be used to determine the device filename corresponding to the desired endpoint. An open( ) system call can then be issued to initialize a read/write session between the host computer and the peripheral device. In Linux™, and UNIX™, it can be typical to treat device interfaces as files, so opening a file in /dev/ttyUSBn has the effect of opening the endpoint for read/write operations.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

In addition, while portions of the above discuss the invention as it can be implemented using a generic OS and/or generic hardware, it is within the scope of the present invention that the method, apparatus and computer program product of the invention can equally be implemented to operate using a non-generic OS and/or can use non-generic hardware.

Further, each step of the method may be executed on any general computer, such as a personal computer, server or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

For example, methods and/or apparatus according the present invention can be provided in the form of at least a portion of a software development kit or toolkit (SDK). The SDK can provide tools for use by software developers, engineers, or the like to facilitate development of applications. For example, SDK tools can include debuggers, software libraries, application programming interfaces, utilities, emulators, documentation, pseudo-code, source code, binary files, header files, tutorials, device drivers, example applications, environments, and other tools. Thus, embodiments of the present invention can be provided for use in end-user applications, or for use as or in developmental tools directed toward potential end-user applications, or for other purposes such as education, quality control, software support, or the like.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for identifying a desired device handle in a host computer system, the desired device handle facilitating interaction with a desired peripheral device, the method comprising the steps of:
    a) providing a database containing encoded therein information associating one or more device handles with one or more peripheral devices;
    b) scanning, using a computer, a first portion of the database for one or more descriptor data entries associated with the desired peripheral device;
    c) determining, using a computer, one or more associated data entries of the database related to the one or more descriptor data entries based on pre-existing implicit or explicit relationships between data entries in the database;
    d) determining, using a computer, a second portion of the database based on the one or more associated data entries, the second portion of the database being a strict subset of the database; and
    e) scanning, using a computer, the second portion of the database for information indicative of the desired device handle; and
    f) identifying, using a computer, the desired device handle based on the information indicative thereof.

2. The method of claim 1, wherein the peripheral device is a USB™ device, and wherein the desired device handle facilitates interaction with one or more endpoints of the USB™ device.

3. The method of claim 1, wherein the database comprises a file system.

4. The method of claim 3, wherein the file system is a Linux™ sysfs file system.

5. The method of claim 3, wherein the one or more descriptor data entries are contained in one or more files of the file system.

6. The method of claim 5, wherein the step of determining one or more associated data entries includes determining names of a first set of one or more file directories containing said one or more files of the file system.

7. The method of claim 6, wherein the step of determining a second portion of the database includes determining a second set of one or more file directories within a predetermined portion of the file system, the second set of one or more file directories selected based on one or more similarities between names of the first set of one or more file directories and names of the second set of one or more file directories.

8. The method of claim 7, wherein the desired device handle is a file handle contained in one of the second set of one or more file directories.

9. The method of claim 1, wherein the one or more descriptor data entries are indicative of information selected from the group comprising: product IDs, vendor IDs, serial numbers, and configuration information.

10. The method of claim 1, wherein the one or more associated data entries are determined based at least in part on information associated with the one or more descriptor data entries, said information selected from the group comprising: explicit links, implicit links, pointers, shared portions of data entries, similarities of data entries, and parent/child relationships between data entries.

11. The method of claim 1, wherein the second portion of the database is determined based at least in part on information associated with the one or more associated data entries, said information selected from the group comprising: explicit links, implicit links, pointers, shared portions of data entries, similarities of data entries, and parent/child relationships between data entries.

12. The method of claim 1, wherein the step of identifying the desired device handle comprises using supplementary information indicative of the desired device handle.

13. The method of claim 12, wherein said supplementary information is an ordinal number indicative of which of an ordered plurality of device handles is the desired device handle.

14. The method of claim 1, wherein steps (a) to (f) are repeated.

15. An apparatus for identifying a desired device handle in a host computer system, the desired device handle facilitating interaction with a desired peripheral device, the apparatus comprising:
   a) a database containing encoded therein information associating one or more device handles with one or more peripheral devices;
   b) a first scanning module configured to scan a first portion of the database for one or more descriptor data entries associated with the desired peripheral device;
   c) a first processing module configured to determine one or more associated data entries of the database related to the one or more descriptor data entries based on pre-existing implicit or explicit relationships between data entries in the database;
   d) a second processing module configured to determine a second portion of the database based on the one or more associated data entries, the second portion of the database being a strict subset of the database;
   e) a second scanning module configured to scan the second portion of the database for information indicative of the desired device handle; and
   f) a third processing module configured to identify the desired device handle based on the information indicative thereof.

16. The apparatus of claim 15, wherein the peripheral device is a USB™ device, and wherein the desired device handle facilitates interaction with one or more endpoints of the USB™ device.

17. The apparatus of claim 15, wherein the database comprises a tree, linked list, relational database, hierarchical database, or network database.

18. The apparatus of claim 15, wherein the database comprises a file system.

19. The apparatus of claim 18, wherein the file system is a Linux™ sysfs file system.

20. The apparatus of claim 18, wherein the one or more descriptor data entries are contained in one or more files of the file system.

21. The apparatus of claim 20, wherein the first processing module is configured to determine the one or more associated data entries based at least in part on names of a first set of one or more file directories containing said one or more files of the file system.

22. The apparatus of claim 21, wherein the second portion of the database determined by the second processing module includes a second set of one or more file directories within a predetermined portion of the file system, the second set of one or more file directories having one or more similarities between names of the first set of one or more file directories and names of the second set of one or more file directories.

23. The apparatus of claim 22, wherein the desired device handle is a file handle contained in one of the second set of one or more file directories.

24. The apparatus of claim 15, wherein the one or more descriptor data entries are indicative of information selected from the group comprising: product IDs, vendor IDs, serial numbers, and configuration information.

25. The apparatus of claim 15, wherein first processing module is configured to determine the one or more associated data entries based at least in part on information associated with the one or more descriptor data entries, said information selected from the group comprising: explicit links, implicit links, pointers, shared portions of data entries, similarities of data entries, and parent/child relationships between data entries.

26. The apparatus of claim 15, wherein the second processing module is configured to determine the second portion of the database based at least in part on information associated with the one or more associated data entries, said information selected from the group comprising: explicit links, implicit links, pointers, shared portions of data entries, similarities of data entries, and parent/child relationships between data entries.

27. The apparatus of claim 15, wherein the second scanning module returns a plurality of device handle locations or names, said plurality including a location or a name of the desired device handle, and the third processing module is further configured to identify the location or the name of the desired device handle from the plurality based at least in part on supplementary information indicative of the desired device handle.

28. The apparatus of claim 27, wherein said supplementary information is an ordinal number indicative of which of an ordered plurality of device handles is the desired device handle.

29. A computer readable medium having recorded thereon statements and instructions for execution by a computer to carry out a method for identifying a desired device handle in a host computer system, said computer configured to access a database containing encoded therein information associating one or more device handles with one or more peripheral devices, the desired device handle facilitating interaction with a desired peripheral device, the method comprising the steps of:
   a) scanning a first portion of the database for one or more descriptor data entries associated with the desired peripheral device;
   b) determining one or more associated data entries of the database related to the one or more descriptor data entries based on pre-existing implicit or explicit relationships between data entries in the database;
   c) determining a second portion of the database based on the one or more associated data entries, the second portion of the database being a strict subset of the database;
   d) scanning the second portion of the database for information indicative of the desired device handle; and
   e) identifying the desired device handle based on the information indicative thereof.

30. The computer readable medium of claim 29, wherein the computer readable medium is part of a software development kit.

* * * * *